(12) United States Patent
Lair

(10) Patent No.: US 8,594,016 B2
(45) Date of Patent: Nov. 26, 2013

(54) METHOD FOR OPTIMIZING A USER EQUIPMENT PDN (PACKET DATA NETWORK) CONNECTION

(75) Inventor: Yannick Lair, Reading (GB)

(73) Assignee: NEC Corporation, Tokyo (JP)

( * ) Notice: Subject to any disclaimer, the term of this patent is extended or adjusted under 35 U.S.C. 154(b) by 537 days.

(21) Appl. No.: 12/933,622

(22) PCT Filed: Mar. 3, 2009

(86) PCT No.: PCT/JP2009/054366
§ 371 (c)(1),
(2), (4) Date: Sep. 20, 2010

(87) PCT Pub. No.: WO2009/116409
PCT Pub. Date: Sep. 24, 2009

(65) Prior Publication Data
US 2011/0026463 A1    Feb. 3, 2011

(30) Foreign Application Priority Data
Mar. 21, 2008    (EP) .................................... 08102858

(51) Int. Cl.
*H04W 4/00*     (2009.01)
*H04L 12/28*    (2006.01)

(52) U.S. Cl.
USPC .......................................... 370/328; 370/401

(58) Field of Classification Search
None
See application file for complete search history.

(56) References Cited

U.S. PATENT DOCUMENTS

| | | | |
|---|---|---|---|
| 2008/0254768 A1* | 10/2008 | Faccin ......................... | 455/411 |
| 2008/0259873 A1* | 10/2008 | Ahmavaara et al. ......... | 370/331 |
| 2009/0086705 A1* | 4/2009 | Zisimopoulos et al. ...... | 370/347 |
| 2009/0232022 A1* | 9/2009 | Savolainen et al. .......... | 370/254 |
| 2009/0305707 A1* | 12/2009 | Pudney ........................ | 455/445 |
| 2010/0048168 A1* | 2/2010 | Fox .............................. | 455/410 |
| 2010/0240385 A1* | 9/2010 | Lohr et al. ................. | 455/452.2 |
| 2010/0267388 A1* | 10/2010 | Olsson ......................... | 455/436 |
| 2012/0063419 A1* | 3/2012 | Zhao et al. ................... | 370/331 |

FOREIGN PATENT DOCUMENTS

| | | |
|---|---|---|
| CN | 1564495 A | 1/2005 |
| EP | 1 890 515 A2 | 2/2008 |
| WO | 03/043237 A1 | 5/2003 |

OTHER PUBLICATIONS

Office Action, dated Sep. 24, 2012, issued by the State Intellectual Property Office of the People's Republic of China in counterpart Chinese Patent Application No. 200980110420.2.
Sumsung, 3GPP TSG-sa WG2 Meeting #63 S2-081477, Feb. 2008.
"UE requested bearer resource allocation: Support of Multiple PDN", Ericsson, Marvell, Telecom Italia, Oct. 8-12, 2007, pp. 1-4.

(Continued)

*Primary Examiner* — Eunsook Choi
(74) *Attorney, Agent, or Firm* — Sughrue Mion, PLLC

(57) ABSTRACT

The invention concerns a method for optimizing a UE PDN (Packet Data Network) connection when said UE enters a VPLMN (Visited PLMN) characterized by automatically allocating a default bearer to said UE in said VPLMN during Tracking Area Update procedure. The method according to the invention is preferably but not exclusively used for allowing a local breakout of user plane or control plane traffic when the UE is roaming between several PLMNs.

10 Claims, 5 Drawing Sheets

(56) References Cited

OTHER PUBLICATIONS

"Issue on EMM and GMM state machine", Qualcomm Europe, Feb. 19-21, 2008, 3 pages.

"Clarification on definition and necessity of Default APN and Default Bearer", CATT, Feb. 18-22, 2008, 3 pages.

"3GPP TS 23.401 v8.0.0, $3^{rd}$ Generation Partnership Project; Technical Specification Group Services and System Aspects; General Packet Radio Services and System Aspects; General Packet Radio Service (GPRS) enhancements for Evolved Universal Terrestrial Radio Access Network (E-YTRAN) access (Release 8)", Global System for Mobile Communications, Dec. 2007, pp. 1-167.

* cited by examiner

METHOD FOR OPTIMIZING A USER EQUIPMENT PDN (PACKET DATA NETWORK) CONNECTION

TECHNICAL FIELD

The invention pertains to telecommunication field and concerns a method for optimizing a UE PDN (Packet Data Network) connection when said UE enters a VPLMN (Visited PLMN).

The invention concerns also a User Equipment adapted for implementing said method.

BACKGROUND ART

In EPS (Evolved Packet System), E-UTRAN (Evolved Universal Terrestrial Radio Access Network) capable terminals are allocated a default bearer during the attach procedure. This default bearer provides always-on IP connectivity to a PDN (Packet Data Network). If these terminals attach to their Home PLMN, then they will be allocated a default bearer to access a PDN in Home PLMN.

FIG. 1 illustrates a UE (User Equipment) 2 attached to a HPLMN in a Network architecture comprising a (Mobility Management Entity) MME 4, a Home Serving Gateway 6, and a (Evolved Universal Terrestrial Radio Access Network access network) E-UTRAN 8. The MME is connected to a HSS and the Home Serving Gateway 6 is connected to a PDN Gateway 12 of said HPLMN. The PDN Gateway 12 connects the UE 2 to an operator IP service 14 such as IMS or PSS.

A default bearer 16 is established in Home PLMN in order to allow the UE 2 to access to said operator IP services 18.

FIG. 2 illustrates the case where the UE 2 roams from its HPLMN to a VPLMN.

In this situation, the UE 2 connects to the PDN Gateway 12 and to a PDN Gateway Visited PLMN 20 through a Visited Serving Gateway 22.

A default bearer to visited PDN 24 is established in the VPLMN in order to allow the UE 2 to Visited operator IP services 26. According to the current 3GPP recommendations, one possibility to establish connectivity to the PDN different from default PDN is to use procedure for UE requested PDN connectivity as described below with reference to FIG. 3 describing current state of the art for a UE roaming in a Visited PLMN and asking for extra PDN connectivity further to the Tracking Area Update procedure. It is assumed that this can be the procedure used for local breakout, as described in 3GPP document S2-074760.

When the UE 2 moves to a new Tracking Area, it sends a TAU Request (step 30) to an eNodeB 32. This eNodeB 32 transmits (step 34) said TAU Request to a new MME 36. The new MME 36 sends (step 38) a Context Request to the old MME 40 which responds (step 42) to the new MME 36 by a Context Response.

After authentication of the UE 2 (step 44), the new MME 36 transmits (step 48) a Context Acknowledge to the old MME 40.

At step 50, the new MME 36 transmits a Create Bearer Request to a new serving Gateway 52 which transmits (step 54) an Update Bearer Request to a PDN Gateway 56 in Home PLMN. The PDN Gateway 56 transmits an Update Bearer Request (step 56) to the new serving Gateway 52. Said new serving Gateway 52 transmits a Create Bearer Response (step 58) to the new MME 36.

The later transmits an Update Location (step 60) to a HSS 62 (Home Subscriber Server).

At step 64, the HSS 62 transmits a Cancel Location message to the old MME 40.

At step 66, the old MME 40 responds to the HSS 62 by a Cancel Location ack.

At step 68, the HSS 62 transmits to new MME 36 a request Insert Subscriber Data (IMS, subscriber data).

At step 70, the new MME 36 transmits to HSS 62 a request Insert Subscriber Data Ack.

At step 72, the HSS 62 transmits to the new MME 36 an Update Location Ack.

At step 74, the old MME 40 transmits to the old serving Gateway 76 a Delete Bearer Request.

At step 78, the old serving Gateway 76 transmits to the old MME 40 a Delete Bearer Response.

At step 80, the new MME 36 transmits to the UE 2 a TAU (Tracking Area Update Accept).

At step 82 the UE 2 transmits to the new MME 36 a TAU complete message.

At step 90, the UE 2 requests the setting of a new PDN connection in the VPLMN and sends, at step 92, a PDN connectivity request to the new MME 36.

At step 94, the new MME 36 transmits to the new serving gateway 52 a Create Default Bearer Request.

At step 96, new serving gateway 52 transmits to a PDN Gateway 98 in the VPLMN a Create Default Bearer Request.

At step 98, the PDN Gateway may interact with the PCRF (Policy and Charging Rule Function) to get the default PCC (Policy, Control and Charging) rules for the UE.

At step 100, the PDN Gateway 98 transmits to the new serving gateway 52 a Create Default Bearer Response.

At step 102, the new serving gateway 52 transmits to the new MME 36 a Create Bearer Response.

The new MME 36 transmits, at step 104, a Bearer Setup Request to the eNodeB 32.

At step 106, the eNodeB 32 transmits to the UE 2 a Radio Bearer Establishment Request.

At step 108, the UE 2 transmits to the eNodeB 32, a Bearer Setup Response.

At step 110, the eNodeB 32 transmits to the new MME 36 a Bearer Setup Response.

The new MME 36 transmits, at step 112, to the new serving gateway 52, an Update Bearer Request.

As can be seen in FIG. 3, the PDN connectivity to a new PDN can be established by the UE 2 in order to do local breakout, but this requires an explicit standalone procedure (steps 90 to 112).

However, using this procedure would mean that it is up to the UE (User Equipment) to setup this PDN connectivity when the UE roams in a Visited PLMN. In addition, it is not described in current 3GPP specification how and when the connection to a PDN in Visited PLMN is performed while maintaining a connection to a PDN in Home PLMN.

An object of the present invention is to provide means for establishing the connectivity to a PDN in Visited PLMN as soon as the UE enters this Visited PLMN from another PLMN. This last PLMN can be Home PLMN or another Visited PLMN.

DISCLOSURE OF THE INVENTION

The object of the invention is achieved by a method for optimizing a UE PDN (Packet Data Network) connection when said UE enters a VPLMN (Visited PLMN) characterized by automatically allocating a default bearer to said UE in said VPLMN during Tracking Area Update procedure.

The method according to the invention is preferably but not exclusively used for allowing a local breakout of user plane or control plane traffic when the UE is roaming between several PLMNs.

This allows for example to access the internet, or perform emergency calls using a PDN Gateway in the Visited PLMN, while keeping traffic to default Home PDN sent to PDN Gateway (PDN GW) in Home PLMN. The visited PDN could also be used for some IMS (IP Multimedia core network Subsystem) services, like voice or video, which could benefit from connectivity to a local PDN. The usage of local breakout depends on the Home operator policies and the user's subscription.

In a first embodiment of the method according to the invention, the allocation of said default bearer to the UE in the VPLMN is under the control of Home PLMN.

In a second embodiment of the method according to the invention, the allocation of a default bearer to the UE in the VPLMN is initiated by the UE.

In this embodiment, the UE adds PDN address allocation parameter to the Tracking Area Update Request message.

PDN address and a list of APNs to which the UE is allowed to access are added to the Tracking Area Update Accept message received by the UE in response to said Tracking Area Update request message.

According to another feature of the invention, the UE indicates to an MME (Mobility Management Entity) in Visited PLMN that a default bearer in VPLMN is required via a new flag "extra-default-bearer-request" in the Tracking Area Update request message.

The allocation of said default bearer to the UE in the VPLMN is triggered by said MME upon reception of an extra-default-bearer-request in Tracking Area Update request.

In an alternative variant, the allocation of said default bearer to the UE in the VPLMN is triggered by said MME upon reception of indication whether additional default bearer can be established in the VPLMN and a list of APNs to which the UE is allowed to access, said indication and said list being contained in a Subscription Data.

The invention is implemented by means of a User equipment comprising means for triggering automatic allocation of a default bearer during Tracking Area Update procedure upon entering a VPLMN (Visited PLMN).

Said User Equipment further comprises means for adding PDN address allocation parameter to the Tracking Area Update Request message, and means for generating a new flag "extra-default-bearer-request" in the Tracking Area Update request message to indicate to an MME (Mobility Management Entity) in said Visited PLMN that a default bearer is required, based on pre-configured policies in the UE.

The method according to the invention is used in a Wireless telecommunication network comprising a plurality of base stations, a Home Subscriber Server (HSS), a plurality of Mobility Management Entities (MMES), a plurality of User Equipments (UEs), wherein said Home Subscriber Server (HSS) comprises means for storing indication whether additional default bearer can be established in a VPLMN visited by said UEs, and a list of APNs to which said UEs are allowed to access and means for transmitting said indication and said list of APNs to the Mobility Management Entity (MME) for automatically allocating a default bearer to said UEs in said VPLMN during Tracking Area Update procedure.

Said Mobility Management Entity (MME) comprises means for adding PDN address allocation parameter to a Tracking Area Update Accept message for automatically allocating a default bearer to said UE in said VPLMN during said Tracking Area Update procedure.

BRIEF DESCRIPTION OF THE DRAWINGS

Other features and advantages of the invention will appear from the following description taken as a non limiting example with reference to the following drawings in which.

BEST MODE FOR CARRYING OUT THE INVENTION

Figure 1:
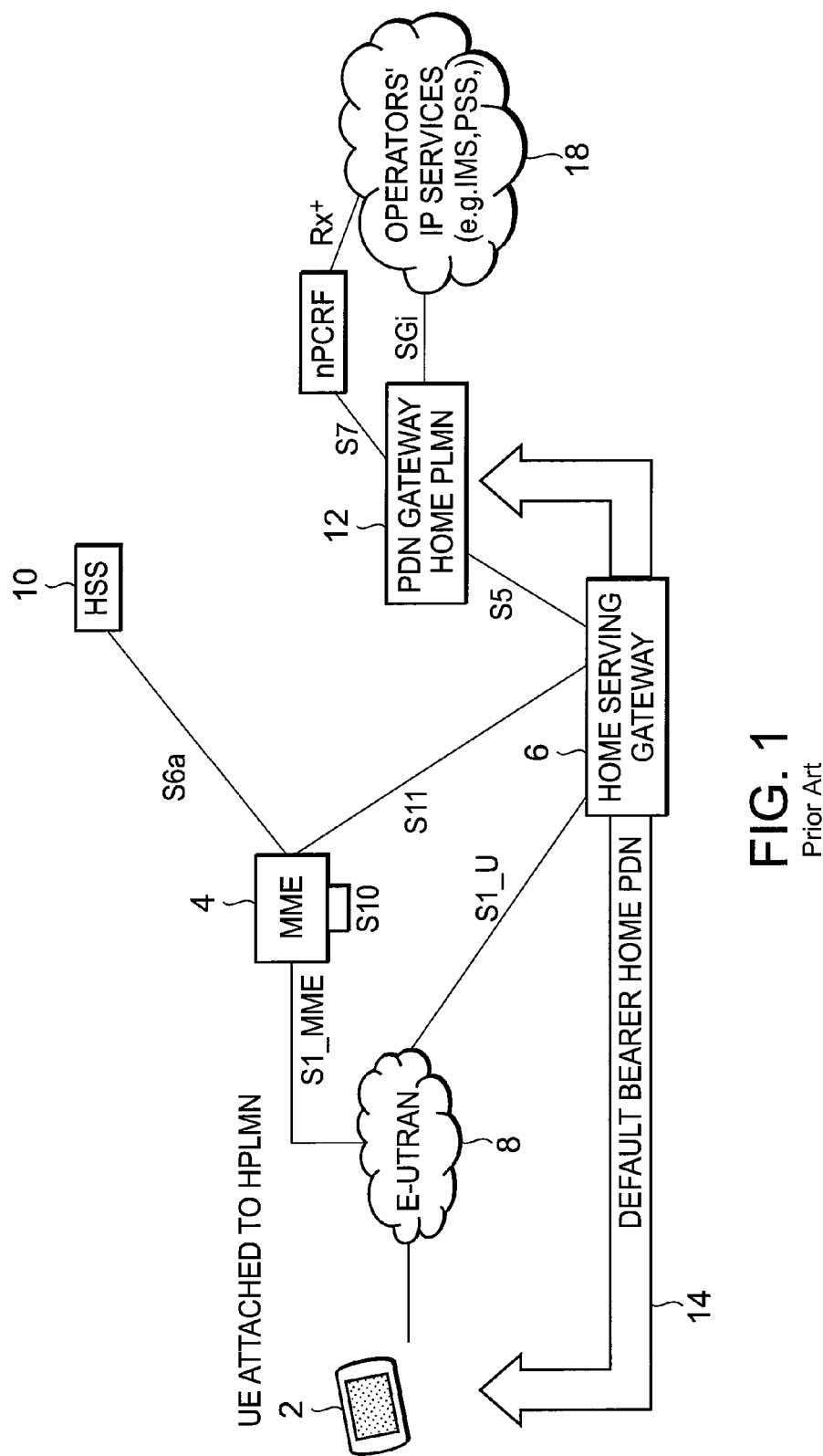
FIG. 1 shows default bearer established in Home PLMN.
Figure 2:
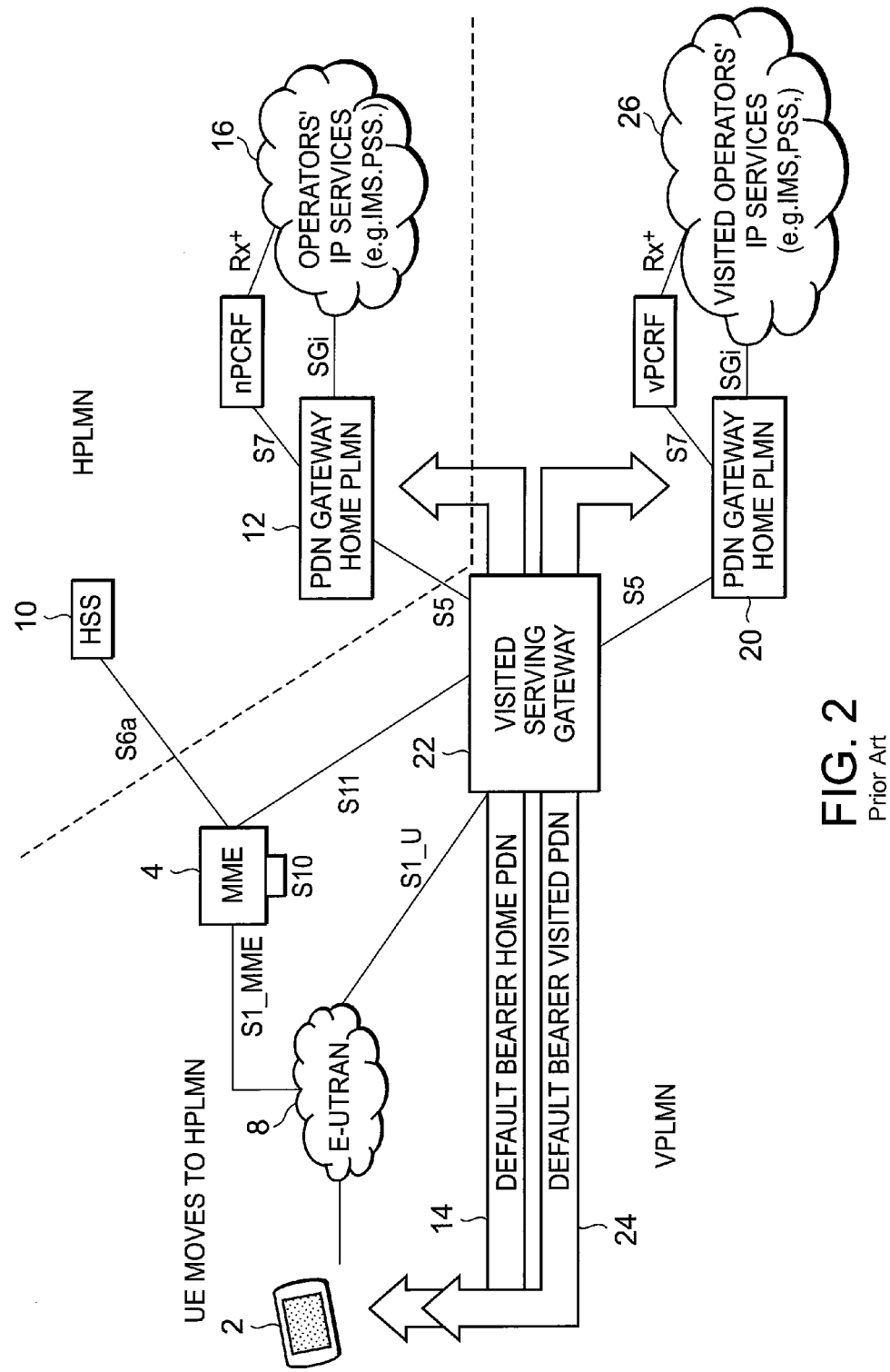
FIG. 2 shows default bearer established in a Visited PLMN.
Figure 3:
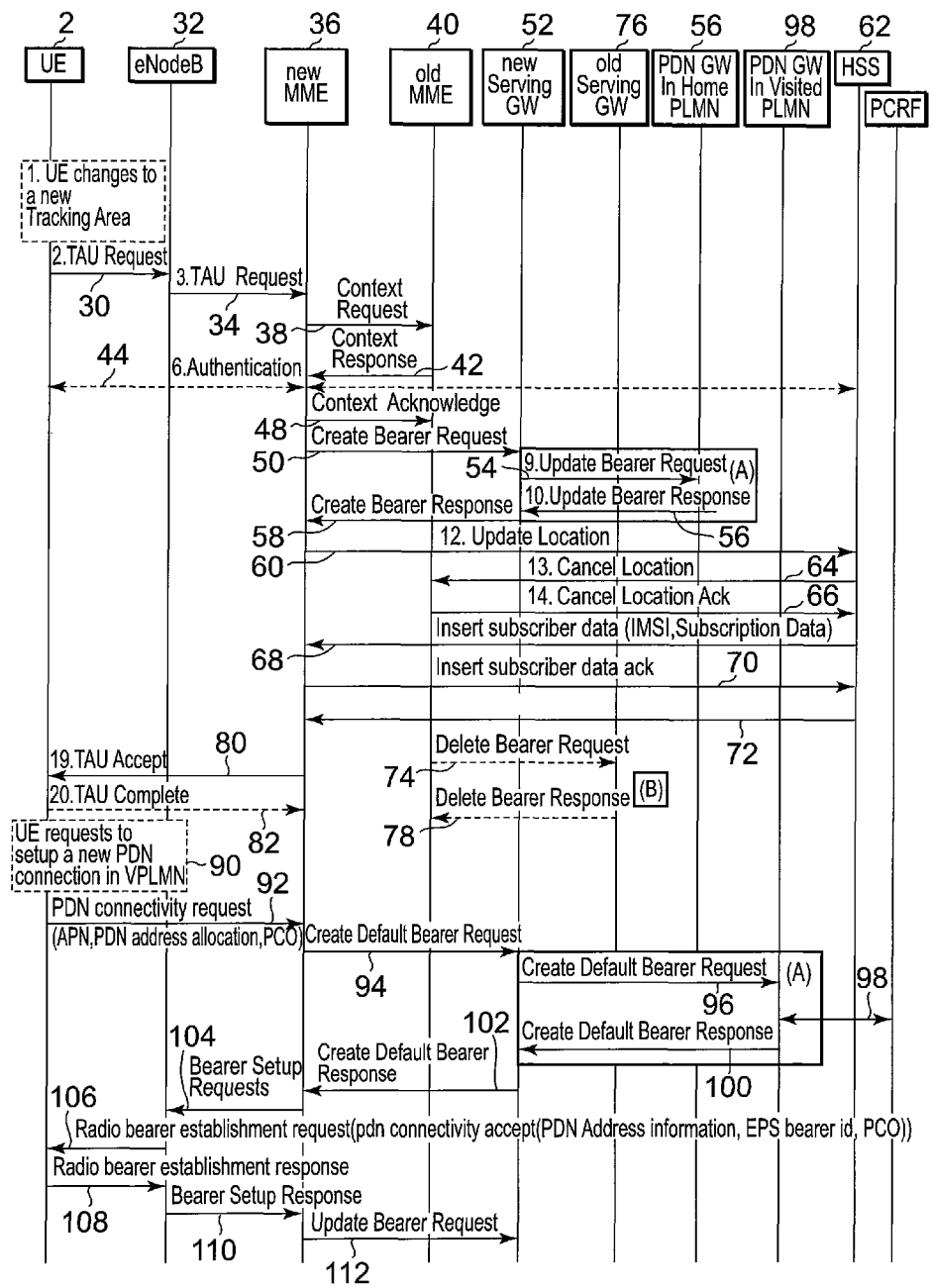
FIG. 3 describes current state of the art for a UE roaming in a Visited PLMN and asking for extra PDN connectivity further to the Tracking Area Update procedure, FIG. 4 describes a Tracking Area Update procedure according to a first embodiment of the invention, FIG. 5 describes a Tracking Area Update procedure according to a second embodiment of the invention.

For the purpose of clarity of the following description, identical features and steps in the drawings illustrating the prior art and those illustrating the present invention will be given the same reference numbers.

Figure 4:
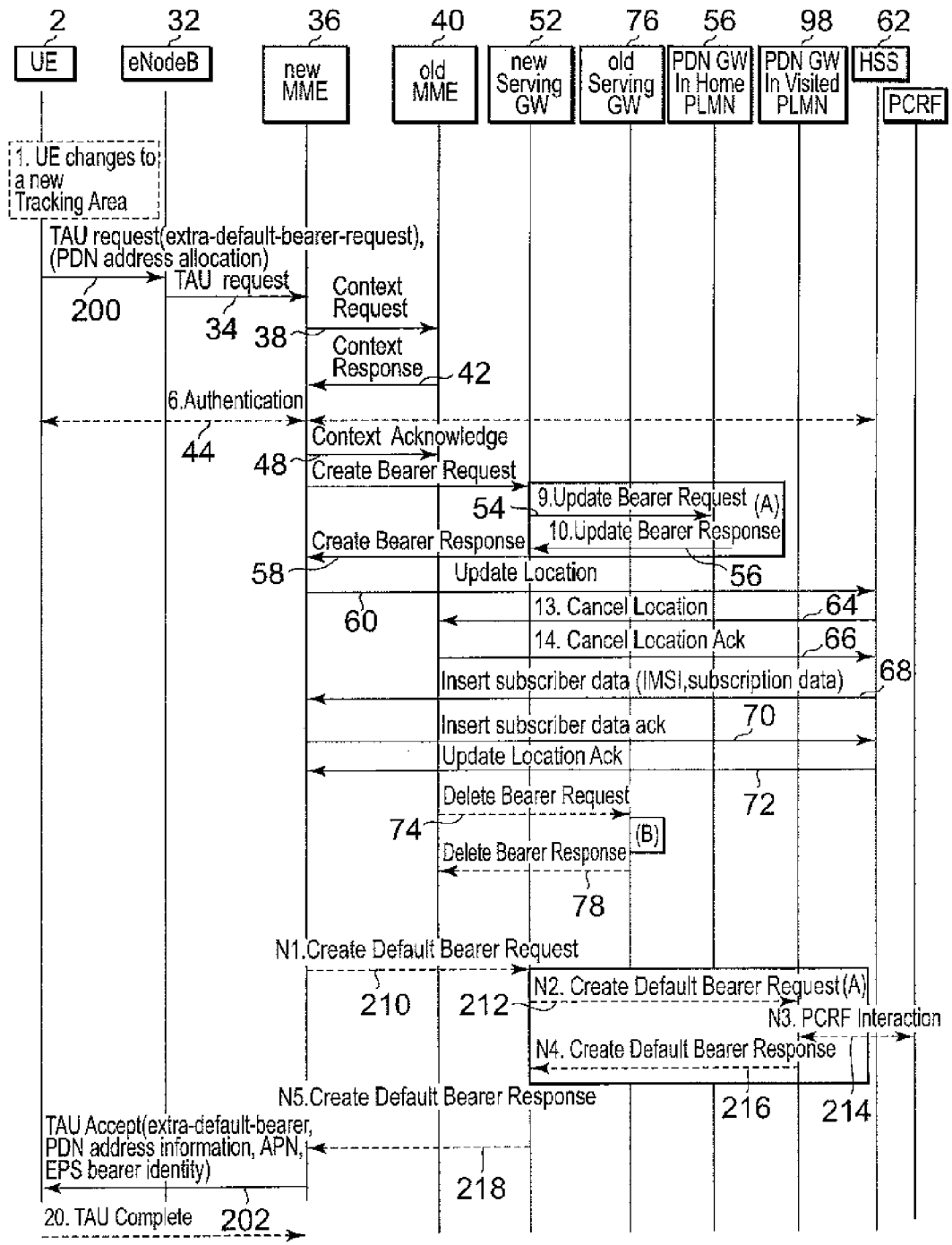

Referring now to FIG. 4, when the UE 2 moves to a new Tracking Area, it sends a TAU Request (step 200), containing PDN address allocation to an eNodeB 32.

In this case, the method comprises the following steps:
  step 210 for the creation of the default bearer between the new MME (Mobility Management Entity) in Visited PLMN and the new serving GW (Gateway) in Visited PLMN,
  step 212 for the creation of the default bearer between the new serving GW and the PDN GW in Visited PLMN,
  step 214 for possible interaction with PCRF to get the default PCC rules for the UE,
  step 216 for the response between PDN GW in Visited PLMN and serving GW in Visited PLMN,
  step 218 for the response between the serving GW in Visited PLMN and the MME in Visited PLMN.

The request for the creation of a default bearer towards a PDN Gateway in Visited PLMN is included in the Tracking Area Update procedure.

It is to be noted that PDN address allocation is included in the Tracking Area Update request message in order to indicate whether it requests the allocation of an IP address during the Tracking Area Update procedure or whether IETF (Internet Engineering Task Force) based IP address allocation mechanisms would be used, and which IP version IPv4 or IPv6 is supported by the UE 2.

Furthermore, in step 68, the subscription data transmitted by the HSS 62 to the new MME 36 contains useful information for the MME for the additional default bearer: information whether additional default bearer can be established in VPLMN, and also a list of all APNs the UE is allowed to access.

Lastly, step 80 is modified as follows: flag extra-default-bearer indicates whether an additional default bearer was established during Tracking Area Update procedure. In case a default bearer was established, APN and PDN Address assigned to the UE 2 are sent from the new MME 36 to the UE 2 in Tracking Area Update Accept message 202 in order to provide the UE 2 with PDN connection information, and EPS bearer identity for the new default bearer is also included in the message.

Alternatively, the flag extra-default-bearer could be removed and the UE 2 would only rely on the presence of APN, PDN Address and EPS bearer identity parameters to conclude whether an additional default bearer was established.

Figure 5:
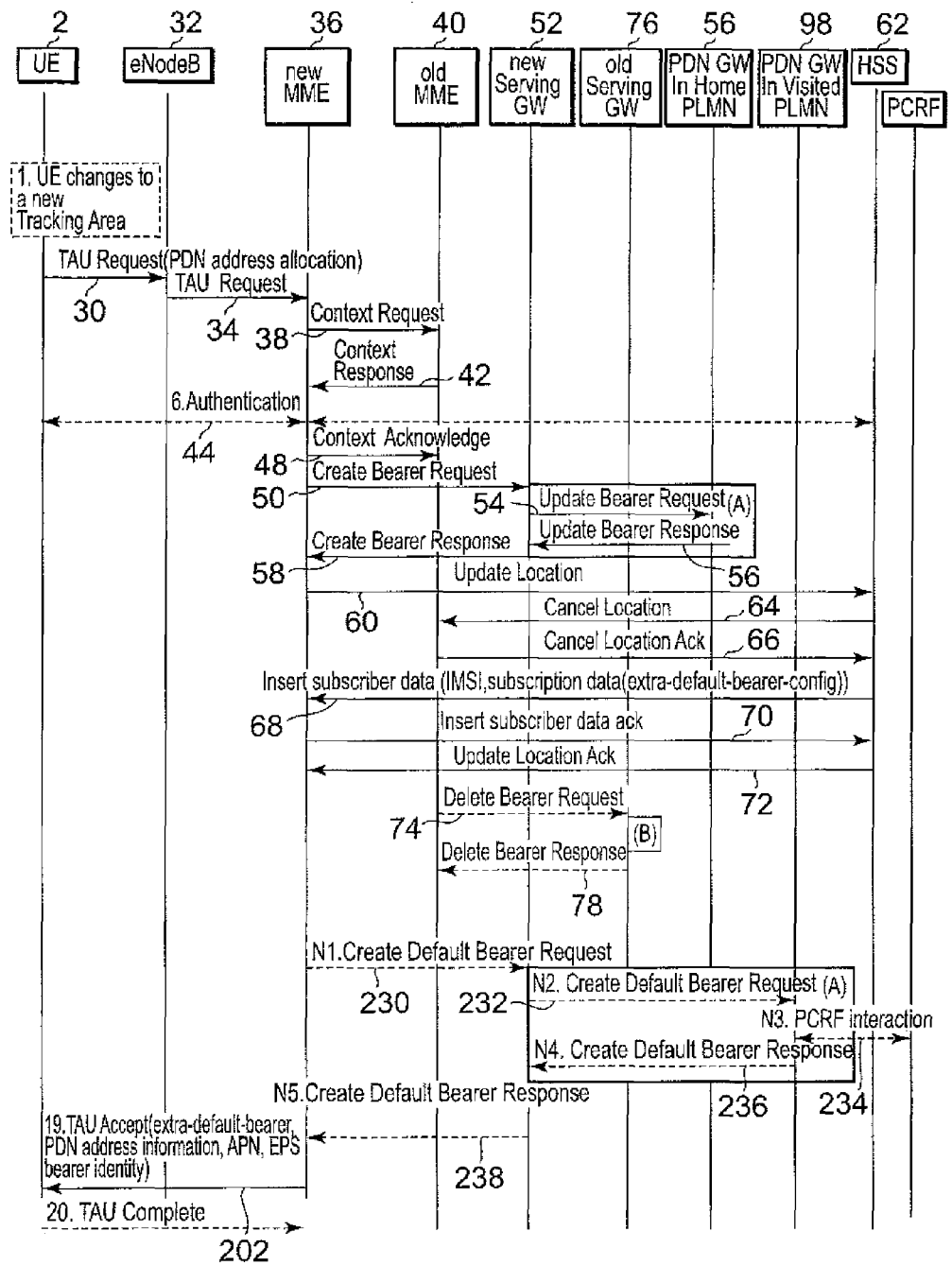

FIG. 5 describes a second embodiment of the invention in which new optional steps are proposed including:

step 230 for the creation of the default bearer between the new MME 36 (Mobility Management Entity) in Visited PLMN and the new serving Gateway 52 in Visited PLMN, step 232 for the creation of the default bearer between the new serving Gateway 52 and the PDN Gateway in Visited PLMN, step 234 for possible interaction with PCRF to get the default PCC rules for the UE, step 236 for the response between PDN Gateway in Visited PLMN and serving GW 52 in Visited PLMN, step 238 for the response between the serving GW in Visited PLMN and the MME in Visited PLMN.

Furthermore, Step 30 is modified as follows: PDN address allocation is included in the Tracking Area Update request message in order to indicate whether it requests the allocation of an IP address during the Tracking Area Update procedure or whether IETF based IP address allocation mechanisms would be used.

In step 68, the subscription data from the HSS 62 contains useful information for the new MME 36 for the additional default bearer: information whether additional default bearer can be established in VPLMN, and also a list of all APNs the UE is allowed to access.

Lastly, step 80 is modified as follows: flag extra-default-bearer indicates whether an additional default bearer was established during Tracking Area Update procedure. In case a default bearer was established, APN and PDN Address assigned to the UE 2 are sent from the new MME 36 to the UE 2 in Tracking Area Update Accept message in order to provide the UE 2 with PDN connection information, and EPS bearer identity for the new default bearer is also included in the message.

Alternatively, the flag extra-default-bearer could be removed and the UE2 would only rely on the presence of APN, PDN Address and EPS bearer identity parameters to conclude whether an additional default bearer was established.

In another embodiment of the invention, parameters extra-default-bearer-request and PDN address allocation from message Tracking Area Update Request are included in an ESM (EPS session management) message and parameters extra-default-bearer, PDN address information, APN and EPS bearer identity from message Tracking Area Update Accept are included in an ESM message.

This application is based upon and claims the benefit of priority from European patent application No. 08102858.1, filed on Mar. 21, 2008, the disclosure of which is incorporated herein in its entirety by reference.

The invention claimed is:

1. A method for optimizing a user equipment (UE) packet data network (PDN) connection when said UE enters a visited public land mobile network (VPLMN) comprising:

automatically allocating a default bearer to said UE in said VPLMN during a Tracking Area Update procedure, wherein the allocation of said default bearer to the UE in the VPLMN is under the control of a Home public land mobile network (PLMN), wherein said allocation of a default bearer to the UE in the VPLMN is initiated by the UE, and wherein said UE adds a PDN address allocation parameter to the Tracking Area Update Request message.

2. The method according to claim 1, wherein said UE indicates to a mobility management entity (MME) in the VPLMN that a default bearer in the VPLMN is required via a new flag "extra-default-bearer-request" added to the Tracking Area Update request message.

3. The method according to claim 2, wherein the "extra-default-bearer-request" flag and the PDN address allocation para from the Tracking Area Update Request message are included in an evolved packet system session management (ESM) message.

4. The according to claim 2, wherein a PDN address and a list of access point names (APNs) to which the UE is allowed to access are added to the Tracking Area Update Accept message received by the UE in response to said Tracking Area Update request message.

5. The method according to claim 2, wherein the "extra-default-bearer-request" flag, the PDN address parameter, an access point name (APN) and evolved packet system (EPS) bearer identity from the Tracking Area Update Accept message are included in an evolved packet system session management (ESM) message.

6. The method according to claim 2, wherein the allocation of said default bearer to the UE in the VPLMN is triggered by said MME upon reception of indication whether additional default bearer can be established in the VPLMN and a list of APNs to which the UE is allowed to access, said indication and said list being contained in a Subscription Data.

7. The method according to claim 2, wherein the allocation of said default bearer to the UE in the VPLMN is triggered by said MME upon reception of an extra-default-bearer-request in Tracking Area Update request.

8. A user equipment comprising:

a means for sending a Tracking Area Update Request message for triggering allocation of a default bearer during Tracking Area Update procedure upon entering a visited public land mobile network (VPLMN), and adding packet data network (PDN) address allocation parameter to said Tracking Area Update Request message; and a means for adding PDN address allocation parameter to the Tracking Area Update Request message.

9. A mobility Management Entity (MME) adapted for optimizing a user equipment (UE) packet data network (PDN) connection when said UE enters a visited public land mobile network (VPLMN), comprising a means for adding PDN address allocation parameter to a Tracking Area Update Accept message, a default bearer being allocated, in accordance with said PDN address allocation parameter, to said UE in said VPLMN during said Tracking Area Update procedure.

10. A telecommunication network according to claim 9 wherein said Mobility Management Entity (MME) comprises a means for adding PDN address allocation parameter to a Tracking Area Update Accept message, a default bearer being allocated, in accordance with said PDN address allocation parameter, to said UE in said VPLMN during said Tracking Area Update procedure.

* * * * *

UNITED STATES PATENT AND TRADEMARK OFFICE
CERTIFICATE OF CORRECTION

| | | |
|---|---|---|
| PATENT NO. | : 8,594,016 B2 | Page 1 of 1 |
| APPLICATION NO. | : 12/933622 | |
| DATED | : November 26, 2013 | |
| INVENTOR(S) | : Yannick Lair | |

It is certified that error appears in the above-identified patent and that said Letters Patent is hereby corrected as shown below:

In the Claims

Column 6, Line 14: In Claim 3, delete "para" and insert -- parameter --

Column 6, Line 17: In Claim 4, after "The" insert -- method --

Column 6, Line 50: In Claim 9, after "(VPLMN)" delete ","

Column 6, Line 55: In Claim 10, after "A" insert -- wireless --

Signed and Sealed this
Eleventh Day of November, 2014

Michelle K. Lee
*Deputy Director of the United States Patent and Trademark Office*